United States Patent [19]

Blum et al.

[11] Patent Number: 4,521,555

[45] Date of Patent: Jun. 4, 1985

[54] PLASTISOLS HAVING CARBON DUST FILLERS

[75] Inventors: Rainer Blum, Ludwigshafen-Edigheim; Max Seitz, Münster-Wolbeck; Friedrich Kaczinski, Münster, all of Fed. Rep. of Germany

[73] Assignee: BASF Farben & Fasern AG, Hamburg, Fed. Rep. of Germany

[21] Appl. No.: 570,307

[22] Filed: Jan. 13, 1984

Related U.S. Application Data

[60] Division of Ser. No. 368,309, Apr. 14, 1982, Pat. No. 4,444,837, which is a continuation-in-part of Ser. No. 106,859, Dec. 26, 1979, abandoned.

[30] Foreign Application Priority Data

Dec. 23, 1978 [DE] Fed. Rep. of Germany ....... 2855919

[51] Int. Cl.$^3$ ................................................ C08K 3/04
[52] U.S. Cl. ......................................... 524/63; 524/65
[58] Field of Search .................................... 524/63, 65

[56] References Cited

U.S. PATENT DOCUMENTS

| | | | |
|---|---|---|---|
| 3,329,632 | 7/1967 | Bryner | 524/63 |
| 3,385,802 | 5/1968 | Trieschock | 428/446 |
| 4,444,837 | 4/1984 | Blum et al. | 524/63 |

FOREIGN PATENT DOCUMENTS 2855919 9/1979 Fed. Rep. of Germany ........ 524/63

*Primary Examiner*—Melvyn I. Marquis
*Attorney, Agent, or Firm*—Wells & Wells

[57] ABSTRACT

Plastisols useful for automobile undercoatings, anti-noise compositions, adhesives, sealing compositions and coatings for untreated, pretreated, phosphated, primed and prelacquered metal bases are improved by the addition of coke dust and coal dust fillers. The carbon dust fillers have a particle size of about 0.5 to 1000 microns and they are used in a concentration of about 9 to 90% by weight based on the total weight of plastisol and carbon dust. The carbon dust filled plastisols have a specific gravity of about 1.1 to 1.3.

6 Claims, No Drawings

PLASTISOLS HAVING CARBON DUST FILLERS CROSS-REFERENCE TO RELATED APPLICATIONS

This is a division of application Ser. No. 368,309, filed Apr. 14, 1982, now U.S. Pat. No. 4,444,837 which in turn is a continuation-in-part of application Ser. No. 106,859, filed Dec. 26, 1979, now abandoned.

Applicants claim priority under 35 USC 119 for application Ser. No. 28 55 919.5, filed December 23, 1978 in the Patent Office of the Federal Republic of Germany.

BACKGROUND OF THE INVENTION

The present invention relates to plastisols made from dispersions of synthetic resins in plasticizers, which contain pigments, dyestuffs, fillers, heat and light stabilizers, adhesives and other additives. These plastisols are flowable or pasty materials, which upon heating to higher temperatures will gel and after cooling form a solid, tough elastic substance.

The proportion of synthetic resin in the plastisol is formed especially by vinylchloride homopolymers or copolymers with another vinyl compound such as vinylidene chloride, vinylacetate or vinylpropionate. Acrylate polymers or acrylate copolymers also are known to be suitable.

The liquid phase of the plastisols is formed by plasticizers such as tricresylphosphate, acetyltributylcitrate, diesters of phthalic acid, adipic acid and sebacic acid with saturated and unsaturated alcohols, for instance, dioctylphthalate, diisooctylphthalate, dinonylphthalate, diallylphthalate, didecylphthalate. Other suitable plasticizers belong the the groups of the saturated and unsaturated liquid polyesters and liquid epoxide compounds. The plasticizer content in the plastisols is so chosen that it suffices to form a plastisol with a liquid to pasty consistency.

The plastisols may also contain a series of auxiliary substances and additives, for instance for controlling the viscosity, the gelling rate, the improvement in light and heat stability and storage stability, as well as pigments, dyestuffs and fillers. To improve the adhesion to the objects to be coated, the plastisols may contain known adhesion improving additives such as phenolaldehyde resins or epoxy resins with the corresponding hardener components of dicyanodiamide, amines or polyaminoamides.

The state of the art of plastisol production may be ascertained by reference to Kirk-Othmer, "Encyclopedia of Chemical Technology," Vol. 15 (1968) pages 738-740 and 771-773, and Vol. 21 (1970), pages 403-404; U.S. Pat. No. 3,050,412 and West German Published Application Nos. 2,123,171, 2,232,885 and 2,512,366, the disclosures of which are incorporated herein.

U.S. Pat. No. 3,050,412 and the West German published applications are concerned particularly with the improvement of adhesion to metal surfaces.

Kirk-Othmer discloses in Vol. 15, pages 738-740 and pages 771-772, plasticizers used in plastisols and on pages 772-773 fillers and pigments are disclosed. Vol. 21 of Kirk-Othmer discloses at pages 403 and 404 the processing of the plastisols of polyvinylchloride and its copolymers.

Plastisols in addition to being suited to the extrusion and calendering processes also are applicable to coating by pouring, dipping and spraying methods. Textile fabrics, wood, wood materials, synthetics and metals can be used as substrates. When metals are used, the coating can be deposited directly on the untreated metal. It is advantageous however that the coating be deposited on pre-treated, phosphated, primed or lacquered metal surfaces.

As a rule, plastisol coatings require baking temperatures between 100° and 250° C. for the preparation of hardened films.

Plastisols are used in forming acoustically damping coatings on metals furthermore protecting against corrosion and gravel or the like, for instance, in air-conditioning ducts and on metal doors, such as automobile doors. A further very important field of application is the use as metal adhesives, for seam sealing and as undercoat protection in motor vehicles.

On technical and economical grounds, the known plastisols contain in addition to the color-imparting pigments, for instance, titanium dioxide, iron oxide pigments, cadmium pigments, also relatively high proportions of fillers such as talcum, chalk, kaolin, asbestos, silica gel, ground shale, barium sulfate, China clay, quartz and other minerals.

Because these fillers are of high densities, the specific weight of the plastisols containing the known fillers is between about 1.5 and 1.9. To obtain a good underbody or undercoat protection in motor vehicles, relatively large layer thicknesses are required. This means, for a layer thickness of about 2-7 mm, that for a passenger car, about 20-40 kg of plastisol material is required. The relatively high weight of undercoat protective substance deposited on the vehicle as a result of the high plastisol density represents a drawback hampering the general application of plastisols in automobile construction.

Attempts have already been made to lower the density of the plastisols containing the known fillers by processing these compositions into foamed plastisols. However, this approach requires a tradeoff against the life of the coating and corrosion resistance.

SUMMARY OF THE INVENTION

Having in mind the limitations of the prior art, it is the object of the present invention to lower the high specific weight of the plastisols used for purposes of automobile undercoat protection while avoiding the known drawbacks, which is tantamount to a reduction in the total weight of the motor vehicle. This is highly desirable on account of the fuel-saving operation of the vehicle.

This object is achieved by a plastisol of a dispersion of fine-particulate synthetic resins in plasticizers containing fillers where the fillers used in the dispersion are coke dust, coal dust or a mixture thereof.

In a preferred embodiment the plastisol is characterized in that coke dust and/or coal dust are used in the dispersion as the fillers.

In another embodiment, the plastisols contain from 9 to 90% by weight of coke and/or coal dust, based on the total weight of plastisol and carbon dust.

Another object of the present invention is to apply the carbon dust containing plastisols of the present invention as undercoatings to motor vehicles.

Still another object of the present invention is to use the carbon dust containing plastisols as an adhesive sealing composition for metal objects.

Yet another object of the present invention is the use of carbon dust containing plastisols of the present invention as an anti-noise composition for metal objects.

Further objects of the present invention are the use of the carbon dust containing plastisols of the present invention for coatings on untreated, pretreated, phosphated, primed and prelacquered metal base materials.

DESCRIPTION OF THE PREFERRED EMBODIMENTS

The coke or coal dusts which are suitable in the sense of the present invention are of natural or synthetic origin and are finely ground powders of coal, coke, lignite, lignite coke, charcoal or bituminous coal. These dusts have a grain fineness between about 0.5 and 1,000 microns and can be produced for instance by wet grinding or micronization and ensuing air sifting from the corresponding types of coal. Surprisingly, the coke or coal dusts defined can be worked into the plastisols in large amounts and thus reduce the specific gravity of the plastisols to a value between about 1.1 and 1.3. To achieve optimal lowering of the density, the coke and coal dusts are the only fillers used. Only when it is desired to lighten or change the dark gray to black color tone caused by the coke or coal dust, or when specific values of corrosion protection or acoustic damping must be achieved, should mixtures with other pigments, dyestuffs or fillers be used. In such cases, the mixtures may contain up to 90% by weight of pigments, dyestuffs or fillers and from 10 to 100% by weight of this is coke and/or coal dust.

Dispersing apparatus conventional in the laquer industry is used to work the coke or coal dusts into plastisols of the present invention.

In addition to lowering the specific gravity, the coke and coal dusts at the same time and in surprising manner cause an improvement in the workability of the plastisols when they are sprayed from a high-pressure spraying apparatus, and they increase the strength of the baked coatings with respect to resistance to mechanical damage.

Furthermore, the plastisols of the present invention already of a low density per se (about 1.1 to 1.3 specific gravity) can be processed in known and conventional manner into foam plastisols. In many cases where in addition to the acoustical damping and mechanical properties there is also a requirement for the foamed form, extraordinarily light coatings with good adhesion can be obtained in this manner, which upon exposure to a salt spray test, show evidence of extraordinarily good resistance to corrosion.

The examples below illustrate the present invention without however limiting it to them. Percentages are by weight and parts are by weight throughout the examples.

EXAMPLE 1 (COMPARISON EXAMPLE)

23 parts of emulsion PVC, K value: 78
14 parts of dioctylphthalate
8 parts of Di-isodecylphthalate
3 parts of epoxied soya oil
8 parts butyl-benzyl phthalate
1.5 parts of polyamide-amine (amine number: 290)
0.5 parts of barium stearate
3 parts of fine-particulate amorphous $SiO_2$, about 200 $m^2/g$
38 parts of chalk (calcite)
1 part of iron oxide black are kneaded in a planetary mixer for 20 minutes into a homogeneous paste and are degassed by a brief application of vacuum. The plastisol obtained is light-grey in color and has a specific gravity of 1.436. It is sprayed by means of a high-pressure sprayer system on the underside of metal bodies as underbody protection and baked for 20 minutes at 175° C. An elastic light gray coating is obtained.

EXAMPLE 2

The procedure is the same as in Example 1 except that in lieu of 38 parts of chalk and 1 part of iron oxide black, 39 parts of finely ground anthracite is used in the same overall weight. The anthracite coal has a grain size distribution from 2 microns to 60 microns. The plastisol is black and has a specific gravity of 1.24. It is processed further as in Example 1, and a black coating is obtained.

EXAMPLE 3

The procedure is the same as in Example 1, except that in lieu of 39 parts of pigments, 20 parts of finely ground anthracite coal are used, resulting in the same pigment volume concentration as in Example 1. The specific gravity of the substance is 1.28 and the color is black.

EXAMPLE 4

The procedure is the same as in Example 3, except that in lieu of anthracite coal, birch retort coke with an average grain fineness of 24 microns is used. The plastisol is black and has a specific gravity of 1.20.

EXAMPLE 5

The procedure is the same as in Example 1, except that in lieu of the chalk and the iron oxide black, the following are used:
30 parts of ground bituminous coal coke, grain size distribution: 7 to 40 microns
5 parts of titanium dioxide (rutile)
4 parts of iron oxide yellow.
The plastisol is deep brown and has a density of 1.24.

We claim:

1. A plastisol comprising a dispersion of fine-particulate synthetic resin in plasticizers, said fine particulate synthetic resin comprising a vinylchloride homopolymer, a copolymer of vinylchloride and another vinyl compound selected from the group consisting of vinylidene chloride, vinyl acetate, and vinyl propionate, said plastisol having a specific gravity of about 1.1 to 1.3 and containing 9 to 90% by weight of a filler consisting essentially of coke dust, coal dust, or mixtures thereof having a particle size of about 0.5 to 1000 microns.

2. A plastisol undercoating composition for motor vehicles comprising a dispersion of fine particulate synthetic resin in plasticizers, said fine particulate synthetic resin comprising a vinylchloride homopolymer, a copolymer of vinylchloride and another vinyl compound selected from the group consisting of vinylidene chloride, vinyl acetate and vinyl propionate, said plastisol having a specific gravity of about 1.1 to 1.3 and containing 9 to 90% by weight of a filler consisting essentially of coke dust, coal dust, or mixtures thereof having a particle size of about 0.5 to 1000 microns.

3. A plastisol adhesive or sealing composition comprising a dispersion of fine particulate synthetic resin in plasticizers, said fine particulate synthetic resin comprising a vinylchloride homopolymer, a copolymer of vinylchloride and another vinyl compound selected from the group consisting of vinylidene chloride, vinyl acetate and vinyl propionate, said plastisol having a specific gravity of about 1.1 to 1.3 and containing 9 to 90% by weight of a filler consisting essentially of coke dust, coal dust or mixtures thereof having a particle size of about 0.5 to 1000 microns.

4. A plastisol antinoise composition for metal objects comprising a dispersion of fine particulate synthetic resin in plasticizers, said fine particulate synthetic resin comprising a vinylchloride homopolymer, a copolymer of vinylchloride and another vinyl compound selected from the group consisting of vinylidene chloride, vinyl acetate and vinyl propionate, said plastisol having a specific gravity of about 1.1 to 1.3 and containing 9 to 90% by weight of a filler consisting essentially of coke dust, coal dust or mixtures thereof having a particle size of about 0.5 to 1000 microns.

5. The plastisol of claim 1, wherein said fine-particulate synthetic resin is an acrylate polymer or an acrylate copolymer.

6. The plastisol of claim 1, further comprising pigments and dyestuffs and said filler comprises 10 to 100% by weight of the total quantity of said filler, said dyestuffs and said pigments.

* * * * *